A. C. ROWE.
PROCESS AND APPARATUS FOR SEALING CARBON TETRACHLORID.
APPLICATION FILED APR. 18, 1911.
1,074,747.
Patented Oct. 7, 1913.
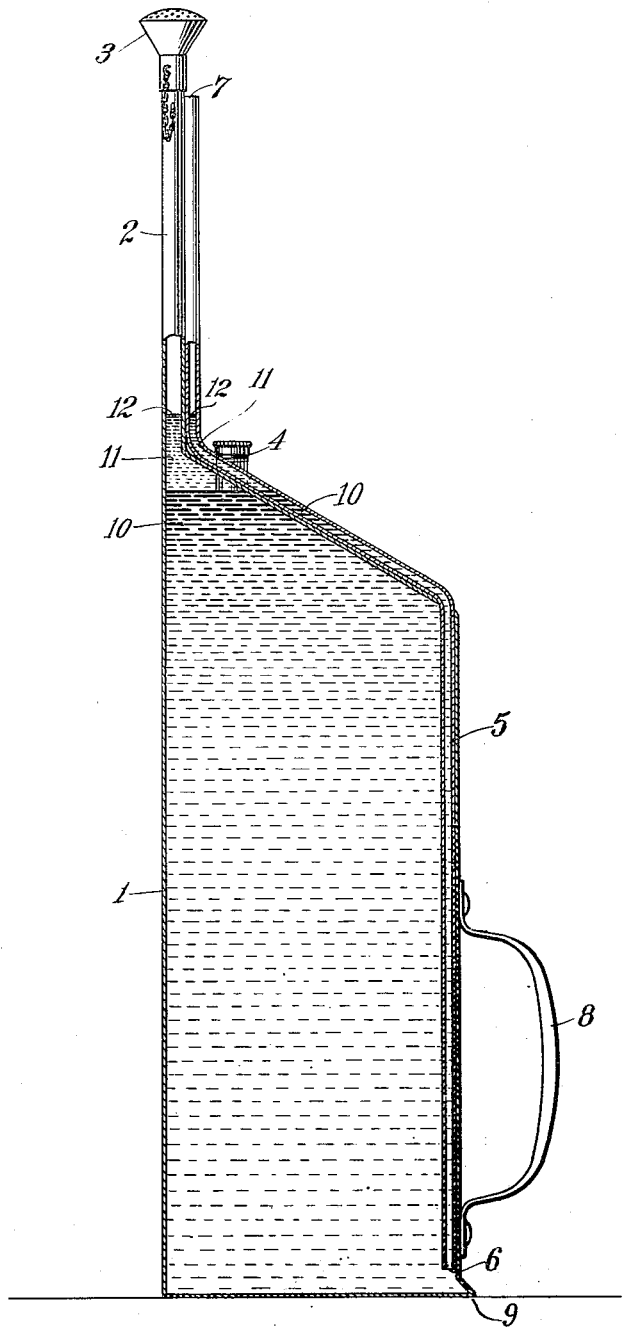

UNITED STATES PATENT OFFICE.

ARTHUR C. ROWE, OF NEW YORK, N. Y., ASSIGNOR TO A. C. ROWE & SON, OF NEW YORK, N. Y., A FIRM COMPOSED OF ARTHUR C. ROWE AND KENNETH P. ROWE.

PROCESS AND APPARATUS FOR SEALING CARBON TETRACHLORID.

1,074,747.  Specification of Letters Patent.  Patented Oct. 7, 1913.

Application filed April 18, 1911. Serial No. 621,805.

*To all whom it may concern:*

Be it known that I, ARTHUR C. ROWE, a citizen of the United States of America, and a resident of the city, county, and State of New York, have invented a new and useful Improvement in Processes and Apparatus for Sealing Carbon Tetrachlorid, which invention is fully set forth in the following specification.

This invention relates to fire-extinguishers employing carbon tetrachlorid as a fire-extinguishing substance; and has for its object the provision of means for containing that body without loss by evaporation, and the provision of means for facilitating its discharge in case of fire.

Carbon tetrachlorid ($CCl_4$) is well known as an efficient fire-extinguishing agent. It is very volatile and its vapors or fumes are not only non-combustible but check and smother combustion. Attempts have been made to employ this substance in various types of fire-extinguishers, yet its loss from evaporation has rendered the same practically worthless. Attempts have also been made to prevent the evaporation by special stoppers or closures for the vessel containing the tetrachlorid, but also without success. The vapors eat into a rubber gasket and escape; while joints of metal or of glass cannot be made sufficiently close-fitting to prevent an appreciable loss during the time the apparatus is standing unused.

A fire-extinguisher which cannot be depended upon to do efficient work, in an emergency, is not reliable, and is therefore of no value. The certainty of its infallible operation is indispensable to a practical and successful fire-extinguisher,—which, moreover, should not require the removal of closures or the opening of valves, etc., in advance of use; on the contrary, the apparatus should be so simple and readily available as to permit its being picked right up at once and used without any other manipulation whatever.

I have devised a system of employing carbon tetrachlorid for fire-extinguishing purposes, which renders the same instantaneously available, and available in an effective manner, and yet will prevent loss from evaporation, and thereby retain the carbon tetrachlorid always of the highest efficiency. My invention is based on the discovery that water will prevent the vaporization of carbon tetrachlorid and is impervious to the fumes or vapors of that body, and consists primarily in employing a water-seal to cover and protect that body. I have further devised a convenient apparatus or receptacle for utilizing my main invention.

My invention will be best understood from a description of a preferred form of apparatus for utilizing the water-seal, which is shown in the annexed drawing.

The drawing is a vertical section through a preferred embodiment of the apparatus.

In the drawing, 1 represents a closed vessel, which may be made of tin or other suitable material, and may be of any shape but is preferably round in cross-section,—in short an ordinary (elongated) cylindrical can or vessel. At 2 is shown an elongated discharge-spout, being preferably (as shown) a straight prolongation from one side of the vessel. At its nozzle, the spout 2 is preferably provided with an ordinary rose-sprinkler 3. This sprinkler may be detachable, as it may sometimes be desired to throw a solid stream of the contents, instead of spraying it through the sprinkler.

4 is the inlet, for filling the vessel, provided with a screw-cap or other closure, and communicating directly with the interior of the vesssel.

5 is a continuous closed air-tube, whose lower end 6 extends to very near the bottom of the interior of the main receptacle 1, while its upper end 7 terminates near the nozzle of tube 2, being open to the air. The purpose of this tube is to permit air to enter when the vessel is inverted, so that no suction will stand in the way of its contents being readily discharged through such spout 2.

The handle 8 is secured to the vessel, near the bottom thereof, and opposite spout 2. Preferably there will be an offset 9 in the wall of the vessel, adjacent the lower end of tube 5.

To fill or charge the vessel, first a small quantity of (pure) water is introduced through inlet 4, sufficient to rise above the lower end 6, of the air-tube; then the vessel is filled with carbon tetrachlorid ($CCl_4$), after which inlet 4 is closed. The tetrachlorid is heavier than water and will not mix with water; consequently some of the water is forced up in tube 5, while the rest of the water rises upon top of the tetrachlorid which is within the main vessel. So that the carbon tetrachlorid 10—10 stands at the same level in the main vessel and in the tube, while the water 11—11 lies upon top, and constitutes a perfect seal in both compartments. The use of the water-seal permits the employment of a rubber gasket in cases where a mechanical seal is also desired, since the water protects the gasket from the injurious effects of the tetrachlorid vapors. I have found that ordinary water serves this purpose admirably, preventing entirely (so far as I have been able to ascertain) any loss whatsoever of the carbon tetrachlorid. But I have also found that if bicarbonate of soda be dissolved in the water, then the carbon tetrachlorid escapes (due, perhaps, to some chemical reaction),—the quantity of the tetrachlorid diminishing appreciably within a short time, while the layer of soda-bicarbonate solution upon top does not seem to be lessened. The ordinary water, however, will remain for a long time without substantial loss; yet, if desired, a further seal for the water, as of kerosene-oil (or other non-volatile liquid), may be employed on top of the water. For instance, in a vessel having a capacity of several quarts, I would first introduce say about a teaspoonful of kerosene-oil and about a cupful of water (and it is immaterial whether these be introduced separately or together, since the oil will rise on top of the water), and thereafter I introduce the carbon tetrachlorid, after which the three substances will assume their proper positions, a film of oil 12—12 on top as a seal for the water, and the water 11—11 in the intermediate position as a seal for the tetrachlorid 10—10. This makes a perfect liquid seal, which will remain for an indefinite time, or until the contents of the vessel are used. The kerosene-oil alone will not seal the tetrachlorid, as these two substances combine at once on being brought together, and no seal is effected. The oil, when used, is a mere film, the thickness of the layer 12 being exaggerated in the drawing for the sake of clearness.

To use the extinguisher, all that is necessary is merely to pick the vessel up by its handle 8 (which, being located below the center of gravity, will naturally tend to elevate the inner end 6 of the air-tube 5) and present the sprinkler or nozzle at the conflagration. Thereupon the contents will be readily and promptly discharged, with the desired result.

I have explained the vessel itself with some particularity, but merely in order to show one method of utilizing the water-seal, since other vessels and other methods of utilization of the principle might suggest themselves, without departing from the spirit of my main invention which consists in employing water as a seal to prevent volatilization of carbon tetrachlorid ($CCl_4$). As above noted, water with bicarbonate of soda will not serve as a seal, yet there may be other liquids which are impervious to the vapor of carbon tetrachlorid and which will therefore serve as a seal. In practical use, I have employed "ordinary water" without taking pains to secure rain water or distilled water.

According to my observations, glycerin or any other liquid of less specific gravity than the calcium tetrachlorid would serve as an efficient seal for the latter, provided there is no affinity (either chemical or physical) between the two liquids or between any constituent of one liquid and a constituent of the other. Such liquid, being of less specific gravity than the tetrachlorid, will lie upon top of the latter and cover it; and if there be no affinity (either chemical or physical) then there will be no opportunity for the generation of the vapor of the tetrachlorid (that is to say, for volatilization), and of course there would therefore be no loss of the tetrachlorid due to its volatilization.

Having thus described my invention, I claim:

1. A vessel containing carbon tetrachlorid, and having the upper surface thereof completely covered by water, and having the upper surface of the water completely covered by a non-volatile liquid.

2. A fire-extinguisher consisting of a vessel containing carbon tetrachlorid and provided with a water-seal for said tetrachlorid consisting of a layer of water floating on the surface thereof.

3. The method of preserving carbon tetrachlorid from evaporation-loss, which consists of covering the exposed surface thereof with water.

4. The method of preserving carbon tetrachlorid from evaporation-loss, which consists of covering the exposed surface thereof with a liquid impervious to its vapors.

In testimony whereof I have signed this specification in the presence of two subscribing witnesses.

ARTHUR C. ROWE.

Witnesses:
C. A. L. MASSIE,
RALPH L. SCOTT.

It is hereby certified that in Letters Patent No. 1,074,747, granted October 7, 1913, upon the application of Arthur C. Rowe, of New York, N. Y., for an improvement in "Processes and Apparatus for Sealing Carbon Tetrachlorid," an error appears in the printed specification requiring correction as follows: Page 2, line 79, for the word "calcium" read *carbon;* and that the proper correction has been made in the files and records of this office and is hereby made in the said Letters Patent.

Signed and sealed this 6th day of January, A. D., 1914.

[SEAL.]

J. T. NEWTON,

*Acting Commissioner of Patents.*